(12) United States Patent
Williamson

(10) Patent No.: US 11,351,643 B2
(45) Date of Patent: Jun. 7, 2022

(54) UNIVERSAL MACHINING APPARATUS AND CONTROL SYSTEM

(71) Applicant: Navarro IP, LLC, Seguin, TX (US)

(72) Inventor: Kirk Ernest Williamson, S, TX (US)

(73) Assignee: Navarro IP, LLC, Seguin, TX (US)

( * ) Notice: Subject to any disclaimer, the term of this patent is extended or adjusted under 35 U.S.C. 154(b) by 267 days.

(21) Appl. No.: 16/280,809

(22) Filed: Feb. 20, 2019

(65) Prior Publication Data
US 2019/0255668 A1 Aug. 22, 2019

Related U.S. Application Data

(63) Continuation of application No. 15/901,708, filed on Feb. 21, 2018, now Pat. No. 10,967,436.

(51) Int. Cl.
*B23Q 3/155* (2006.01)
*B23Q 3/157* (2006.01)
(Continued)

(52) U.S. Cl.
CPC ..... *B23Q 3/15573* (2013.01); *B23Q 3/15713* (2013.01); *B23Q 7/046* (2013.01);
(Continued)

(58) Field of Classification Search
CPC .... B23Q 7/045; B23Q 7/046; B23Q 17/2452; B23Q 17/2471; B23Q 2003/15586;
(Continued)

(56) References Cited

U.S. PATENT DOCUMENTS 2,342,539 A * 2/1944 Gorton ............... B23Q 16/04
188/68
4,087,901 A 5/1978 Lohneis et al.
(Continued)

FOREIGN PATENT DOCUMENTS

CN 105855984 A * 8/2016
DE 102013106427 A1 * 12/2014 .......... B23Q 7/1426
(Continued)

*Primary Examiner* — Erica E Cadugan
*Assistant Examiner* — Michael Vitale
(74) *Attorney, Agent, or Firm* — Matthews, Lawson, McCutcheon & Joseph, PLLC

(57) ABSTRACT

A universal machining system capable of accommodating multiple small-batch or one-off machining jobs, involving workpieces of different diameter and composition, comprises a rotating chuck having multiple jaws that may be adjusted positionally inward or outward towards the longitudinal centerline of the workpiece or removed entirely, and a tool turret capable of holding a variety of socketed tools. System also comprises a measurement sensor, which may be separate or comprise one of the socketed tools. A control program collects machining instructions for a series of workpieces, and directs the chuck, the tool turret, the measurement sensor, and at least one robot to load/unload workpieces and tools from the chuck and turret, respectively, measure workpieces and tools for quality control, and track available storage, overriding or skipping individual machining instructions as dictated by safety parameters and the availability of raw materials and tools.

13 Claims, 15 Drawing Sheets

(51) Int. Cl.
  *G05B 19/418* (2006.01)
  *B23Q 7/04* (2006.01)
  *B23Q 17/24* (2006.01)

(52) U.S. Cl.
  CPC ..... *B23Q 17/2471* (2013.01); *G05B 19/4187* (2013.01); *B23Q 17/2452* (2013.01); *B23Q 2003/15586* (2013.01); *G05B 2219/33099* (2013.01); *G05B 2219/50245* (2013.01); *G05B 2219/50246* (2013.01); *G05B 2219/50391* (2013.01); *Y10T 483/10* (2015.01); *Y10T 483/138* (2015.01); *Y10T 483/165* (2015.01); *Y10T 483/1721* (2015.01)

(58) Field of Classification Search
  CPC .............. B23Q 3/1556; B23Q 3/15573; B23Q 2039/004; B23Q 2220/002; B23Q 2716/02; Y10T 483/13; Y10T 483/132; Y10T 483/134; Y10T 483/136; Y10T 483/138; Y10T 483/16; Y10T 483/165; Y10T 483/1714; Y10T 483/1719; Y10T 483/1721; Y10T 29/5165; Y10T 29/5166; Y10T 29/5167
  USPC ........ 483/7, 8, 9, 10, 11, 14, 15, 22, 24, 25; 29/48.5 R, 49, 48.5 A
  See application file for complete search history.

(56) References Cited

U.S. PATENT DOCUMENTS

| | | | | |
|---|---|---|---|---|
| 4,214,191 A | * | 7/1980 | Watanabe | B23Q 17/09 318/561 |
| 4,296,657 A | * | 10/1981 | Yasuba | G05B 19/41815 82/1.11 |
| 4,359,815 A | | 11/1982 | Toyoda | |
| 4,507,850 A | * | 4/1985 | Kielma | B23B 29/03457 408/2 |
| 4,571,796 A | * | 2/1986 | Sellner | B23B 3/168 29/27 R |
| 4,736,512 A | * | 4/1988 | Gusching | B23Q 7/046 483/14 |
| 4,774,753 A | * | 10/1988 | Holy | B23Q 17/20 33/504 |
| 4,821,402 A | | 4/1989 | Kosho et al. | |
| 5,862,833 A | * | 1/1999 | Perez | F16K 11/074 137/625.11 |
| 6,079,303 A | * | 6/2000 | Lyachovitsky | B23B 31/28 279/114 |
| 2002/0020258 A1 | * | 2/2002 | Grossmann | B23Q 1/76 82/121 |
| 2006/0156978 A1 | | 7/2006 | Lipson et al. | |
| 2008/0040911 A1 | * | 2/2008 | De Koning | G05B 19/41825 483/1 |
| 2008/0085334 A1 | | 4/2008 | Barnett | |
| 2013/0090755 A1 | * | 4/2013 | Kiryu | B23Q 17/2461 700/186 |
| 2017/0165803 A1 | * | 6/2017 | Nakayama | B25J 9/1697 |
| 2017/0300031 A1 | * | 10/2017 | Bernhard | G05B 19/402 |
| 2017/0326700 A1 | * | 11/2017 | Morimura | B23Q 11/0075 |

FOREIGN PATENT DOCUMENTS

| | | | | |
|---|---|---|---|---|
| JP | 63200941 A | * | 8/1988 | ............. B23Q 7/046 |
| JP | 2005193318 A | * | 7/2005 | |

* cited by examiner

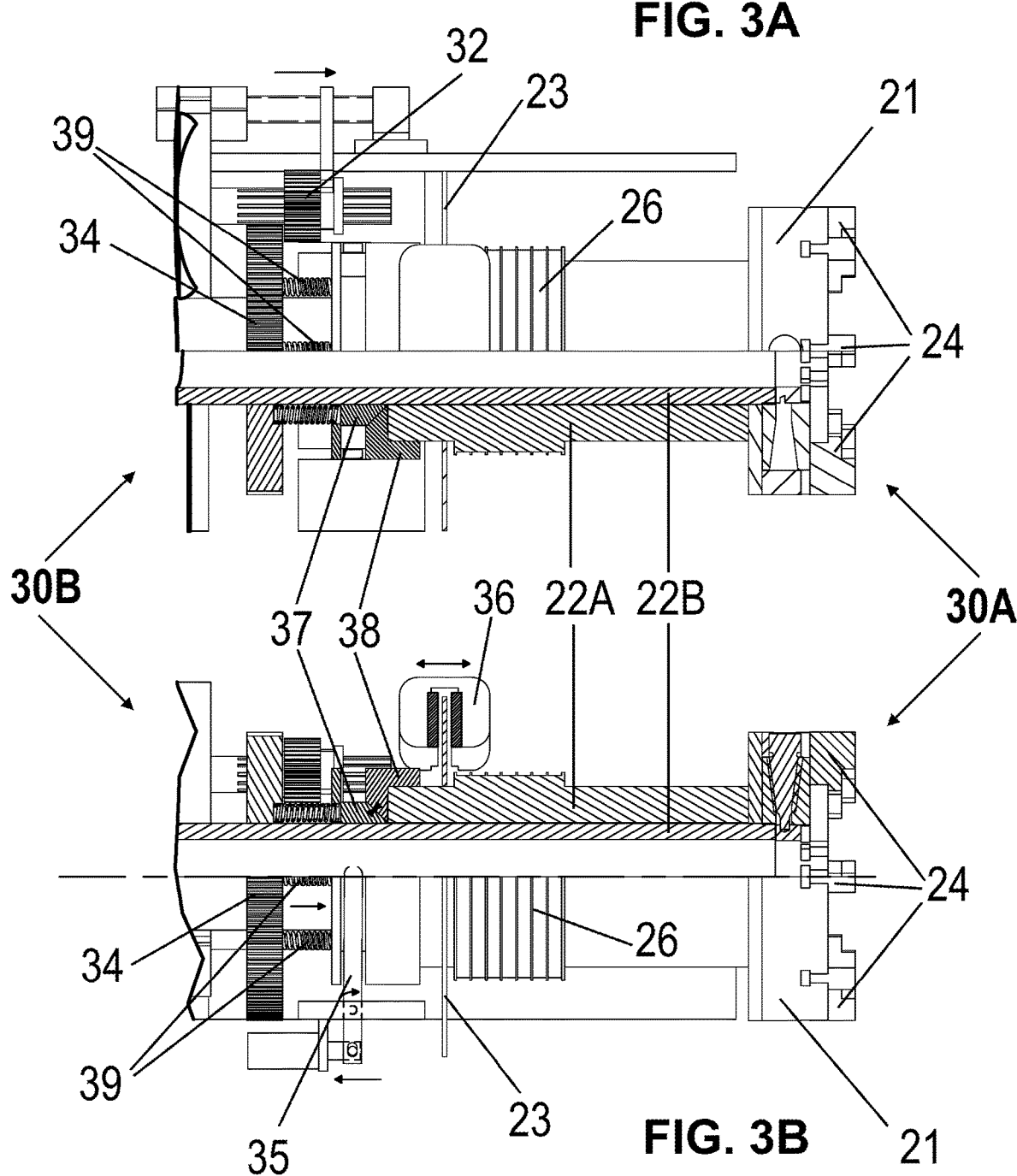

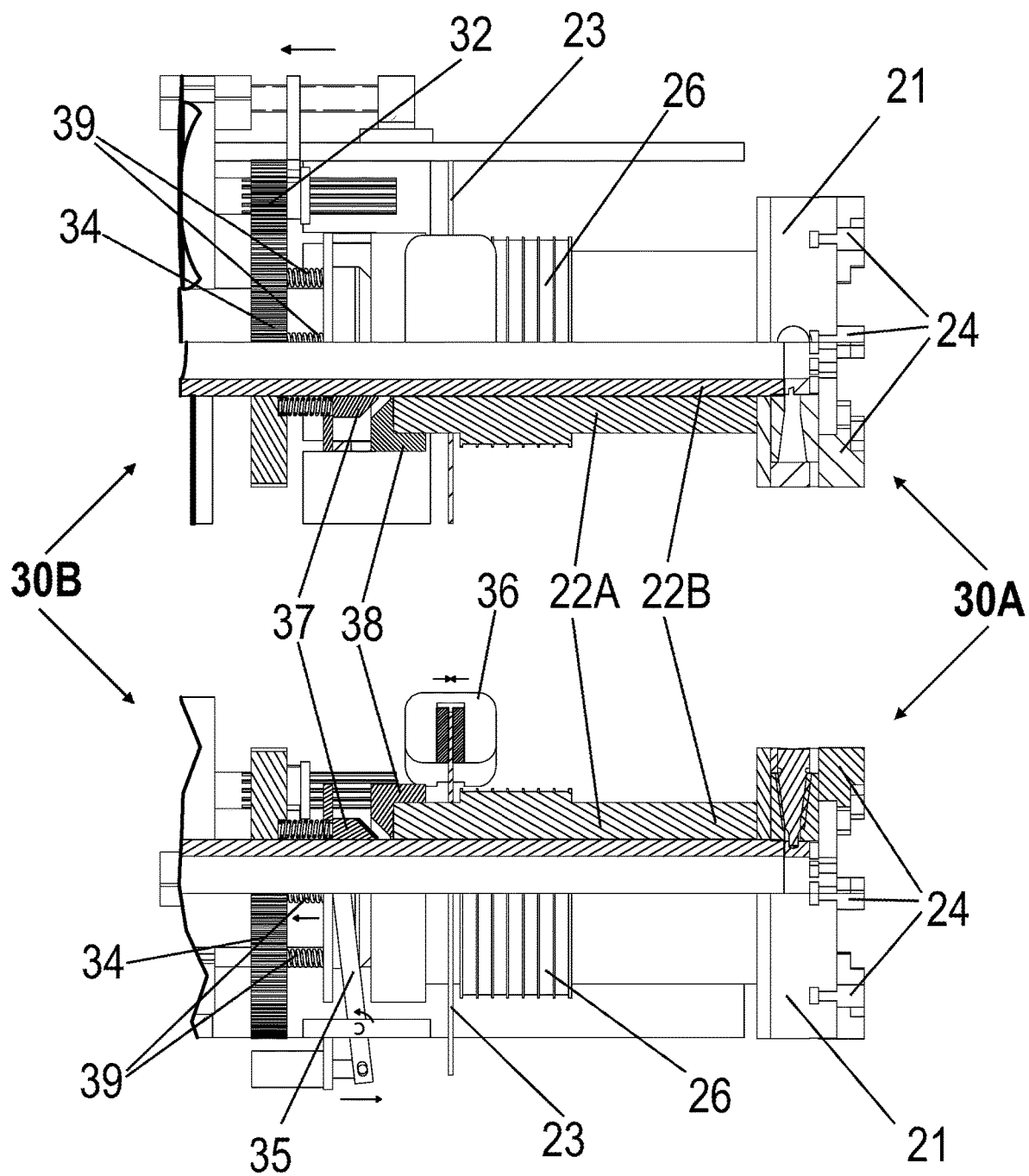

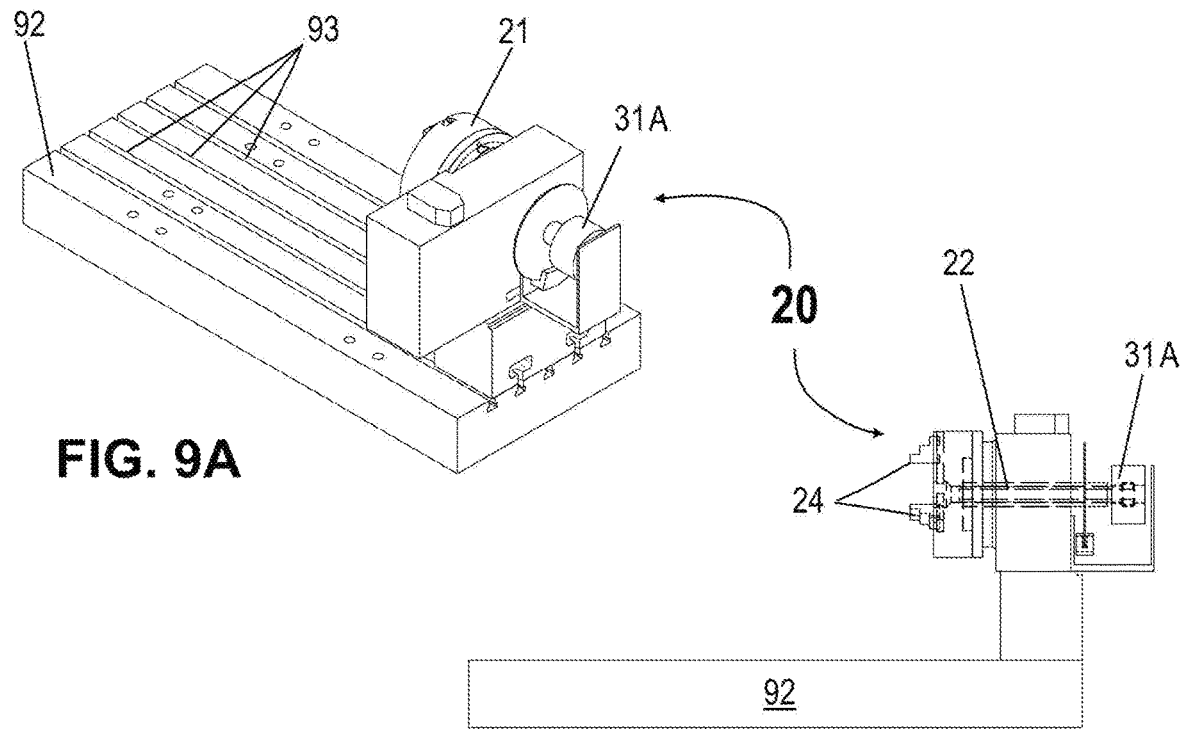
FIG. 9A
FIG. 9B
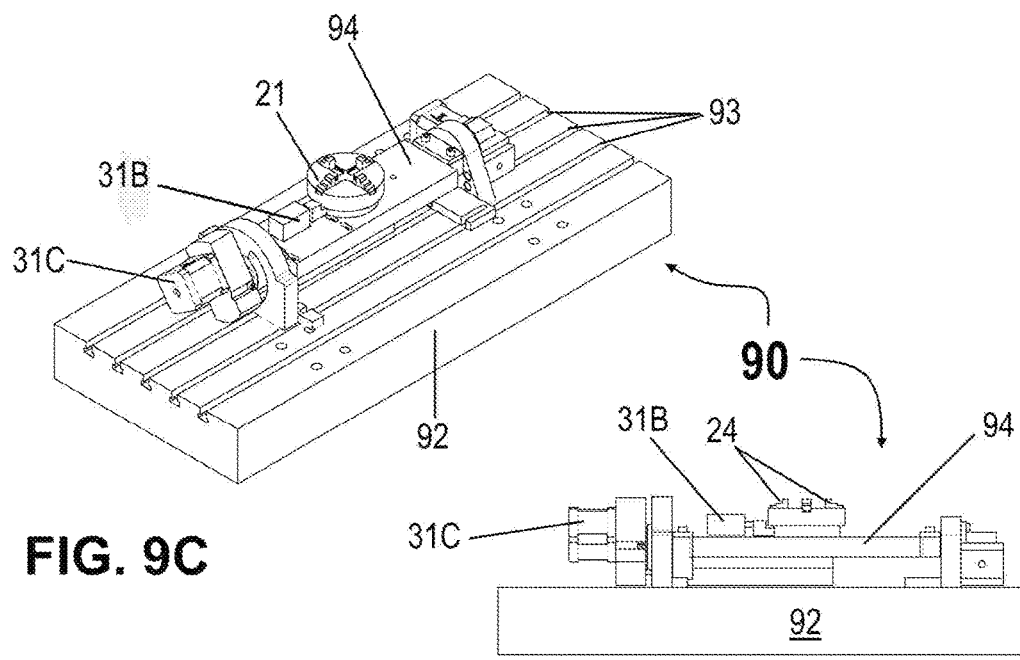
FIG. 9C
FIG. 9D

UNIVERSAL MACHINING APPARATUS AND CONTROL SYSTEM

REFERENCE TO RELATED APPLICATIONS

This application is a continuation-in-part of co-pending U.S. patent application Ser. No. 15/901,708, entitled "Universal Rotating Chuck Apparatus" filed on 21 Feb. 2018, the contents of which are fully incorporated herein by reference.

FIELD

Embodiments usable within the scope of the present disclosure relate, generally, to apparatuses and systems usable for machining workpieces affixed to a rotational chuck having a large degree of customizability, and methods of use conferring significant autonomous operation capability.

BACKGROUND

The recent trend from manual machining to computer-controlled machining (most commonly referred to as "computer numerical control" or CNC machining) has increased the expense of small-batch or one-off machining projects compared to projects ordered in large quantities. This is due to the need to design a program for the individual order, and run the program on proprietary machines that are designed to efficiently process work pieces for large-quantity orders, and which may or may not be ideally suited to the needs of a smaller project.

As a result, there is a demand for smaller batch quantities and methods making more versatile use of the huge capital investment in equipment. The ability to perform smaller batch runs can make an entire company more reactive to market demands.

For instance, a customer may wish to order a one-off production of a single work piece in an exotic alloy, while most machine shops are geared towards the use of more common alloys.

While manual machining is still possible, the lack of qualified manual machinists will result in the labor costs being significantly more expensive, as well as the fact that manual machining is inherently subject to a greater degree of error than CNC machining.

A need exists for a more general computer-controlled machining apparatus that is capable of automatically processing small-batch or one-off work piece orders which may differ significantly in material content or dimensional specifications, and which may require different tools in order to shape.

A need exists for a computer-controlled machining method that can process these disparate orders while minimizing the need for human intervention during measurement and changes in the workpieces and/or tools used.

Embodiments usable within the scope of the present disclosure meet these needs.

BRIEF DESCRIPTION OF THE DRAWINGS

In the detailed description of the embodiments of the invention presented below, reference is made to the accompanying drawings, in which:

FIGS. 3A-3B depict two side views of the embodiments depicted in FIGS. 2A-2B configured for rotation of the workpiece.

FIGS. 4A-4B depict two side views of the embodiments depicted in FIGS. 2A-2B configured for adjustment of the jaws.

FIGS. 9A-9D depict a horizontal and vertical embodiment of the rotating chuck as well as fourth and fifth axis positioning mechanisms.

The depicted embodiments of the invention are described below with reference to the listed figures.

DETAILED DESCRIPTION OF THE EMBODIMENTS

Before explaining the present invention in detail, it is to be understood that the present invention is not limited to the particular embodiments described and depicted and that the present invention can be practiced or carried out in various ways.

Before describing selected embodiments of the present disclosure in detail, it is to be understood that the present invention is not limited to the particular embodiments described herein. The disclosure herein is illustrative of one or more presently preferred embodiments and variations thereof, and it will be appreciated by those skilled in the art that various changes may be made without departing from the spirit of the invention.

As well, it should be understood the drawings are intended to illustrate and plainly disclose presently preferred embodiments to one of skill in the art, but are not intended to be manufacturing level drawings or renditions of final products and the relative size and arrangement of the components may differ from that shown and still operate within the spirit of the invention.

Moreover, it will be understood that various directions such as "upper," "lower," "bottom," "top," "left," "right," and so forth are made only with respect to explanation in conjunction with the drawings to be illustrative and non-limiting, and that the components may be oriented differently, for instance, during transportation and manufacturing as well as operation.

The embodiments described below provide an apparatus and system for automatically manufacturing one-off or small-batch workpieces having disparate specifications with a single machine.

Figure 1:
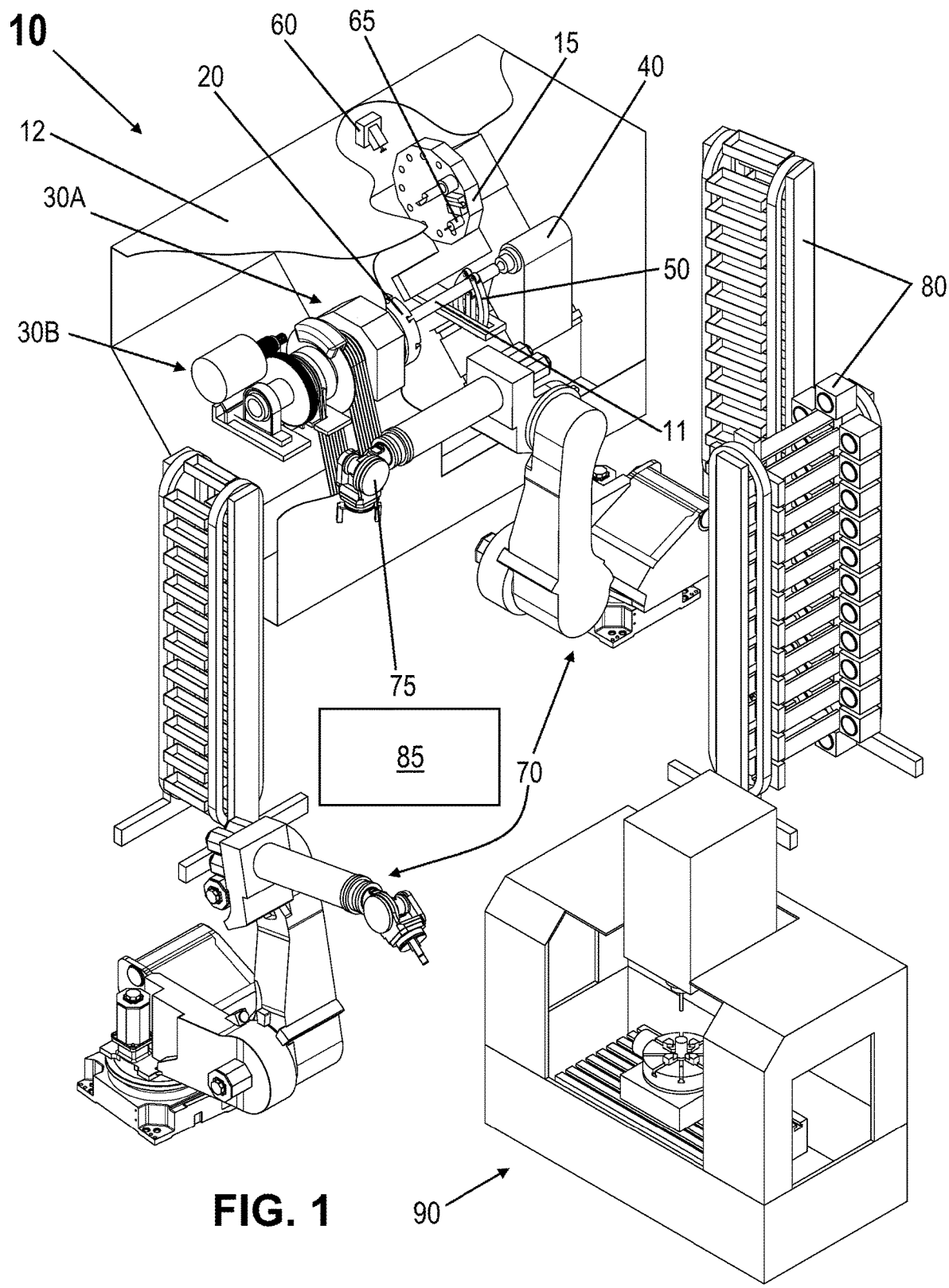
FIG. 1 depicts a perspective, cutaway view of an embodiment of the apparatus.

Turning first to FIG. 1, a high-level illustration of an embodiment of the system 10 is shown with workpiece 11, tool housing 15, rotating chuck 20, chuck drive mechanism 30A, chuck jaw adjustment mechanism 30B, rear support mechanism 40, centerline support mechanism 50, set point sensor 60, and workpiece sensor 65 all programmably adjustable within work envelope 12, either via direct adjustment of the motor mechanisms (set forth subsequently) or by robot 70, including a manipulator 75 and the use of storage systems 80. Computer 85 allows for automation of the system components. Each of these components will be described in greater detail as set forth below.

Broadly speaking, the chuck drive mechanism 30A can rotate the chuck 20, which can hold workpiece 11 in adjustable jaws (set forth subsequently). Jaw adjustment mechanism 30B can include a braking mechanism (set forth subsequently) to prevent unwanted movement of the chuck jaws while the chuck is rotating. Workpiece 11 can be supported at the opposite end of the chuck 20 by rear support mechanism 40, as well as centerline support mechanism 50; both of these mechanisms can be automatically positioned relative to workpiece 11 based on the specifications of the desired workpiece 11 shape.

Tool housing 15 is shown with multiple tools and sockets, in addition to workpiece sensor 65. In an embodiment, tool housing 15 can include multiple sockets for receiving different tool piece ends to be swapped out by robot 70 and manipulator 75. Robot 70 and manipulator 75 can also swap workpiece 11 in and out of the machine for other workpieces (not shown). Set point sensor 60 detects the wear and tear of tool heads (set forth subsequently) mounted to tool housing 15. Workpieces and tool heads can be stored by robot 70 in storage systems 80. Vertical mill 90 is simply a vertical embodiment of the system which works on identical principles to the horizontal embodiment described herein.

Robot 70 (and any other robots discussed in the specification) may be any manipulating machines known in the art, e.g., a Fanuc™ R-2000iB/165F, or a Fanuc™ 200id/7L. Storage systems 80 may be any conveyance system known in the art, e.g., a Vidir™ Shelving Carousel or Vertical Lift System. Set point sensor 60, and workpiece sensor 65 may comprise any probe known in the art, e.g., a Renishaw™ OLP, RMP, RLP, LP2, OTS, RTS, TS34, NC4 or TRS2.

Computer 85 (and the term "computer" as used in this specification) may refer to any consumer or professional-grade desktop, laptop, or single-board computer comprising a microprocessor for reading and executing software instructions, memory (including read-only memory, random-access memory, or direct-access storage such as hard disks, optical disks, solid-state disks, or other suitable media) for storing program instructions and parts and tool databases, at least one display (e.g., a monitor, projector, or remote video feed to a location external to the work envelope) for displaying the system status, job progress, or error codes, and at least one input device (e.g., a mouse, keyboard, speech-recognition software, or remote input feed to a location external to the work envelope) for receiving software instructions (including input parameters) and parts database updates to commit to memory. Embodiments of the invention may also comprise a computer with at least one networking device (e.g., an Ethernet connection or a radio transceiver such as Bluetooth or Wi-Fi) allowing remote configuration of the system via intranet or internet and remote execution of machining programs.

Computer 85 is capable of receiving location and/or pressure input from, and controlling, chuck 20, rear support mechanism 40, centerline support mechanism 50, set point sensor 60, and workpiece sensor 65, either via direct motor control or through manipulation by robot 70 and manipulator 75 (e.g., to store tools in storage systems 80). In an embodiment, the computer can be controlled by a non-proprietary program.

Figure 2A:
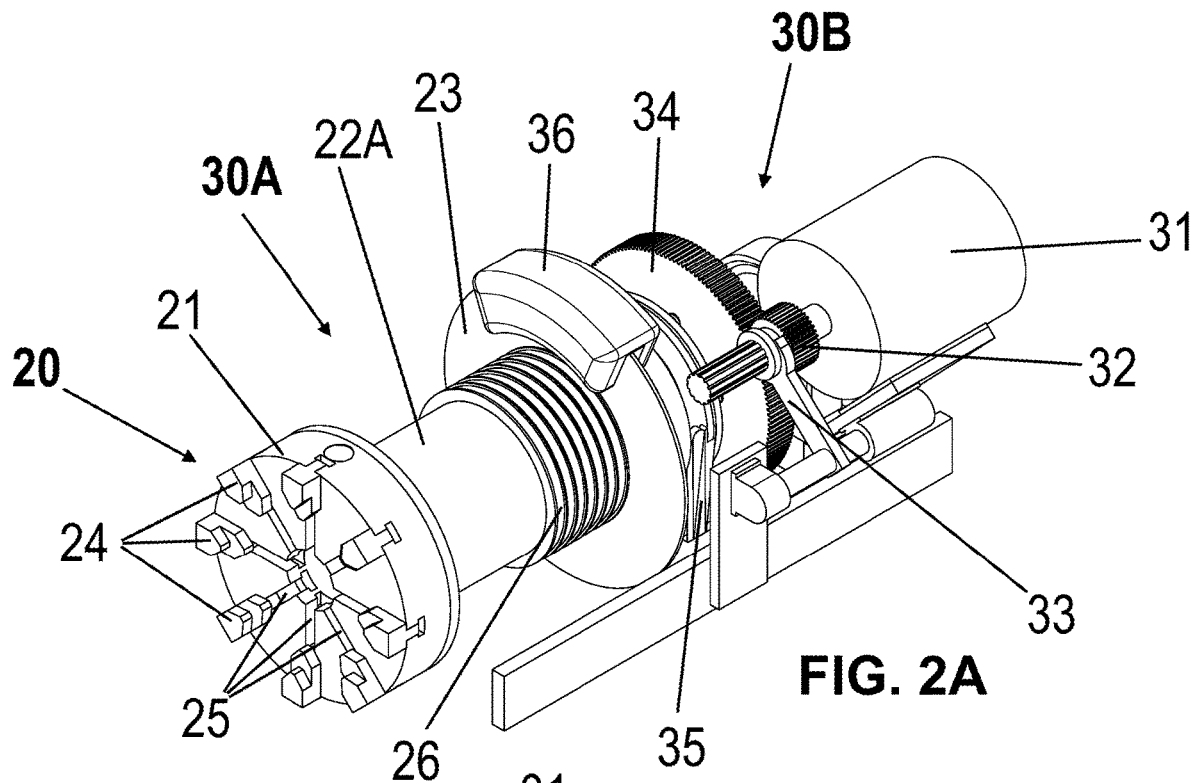
FIGS. 2A-2B depict two perspective views of an embodiment of a rotating chuck, braking mechanism, and jaw adjustment mechanism.
Figure 2B:
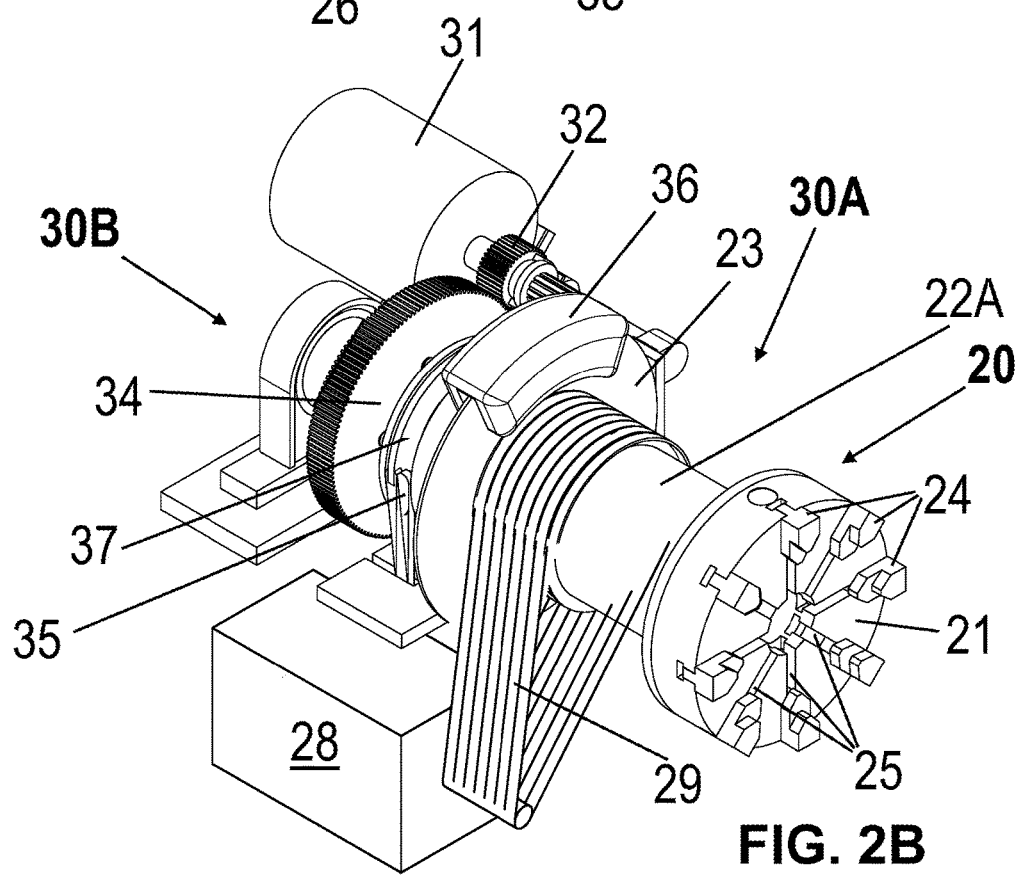
Figure 5A:
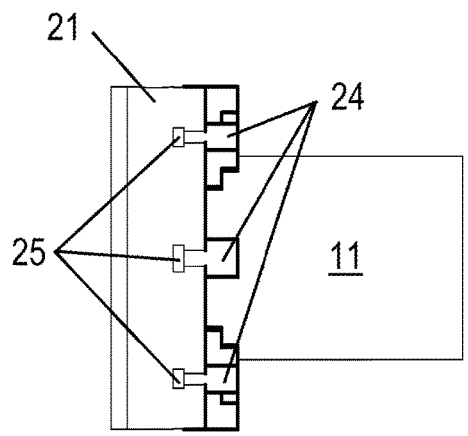
FIGS. 5A-5D depict front and side views of various configurations of the rotating chuck jaw embodiments.
Figure 5B:
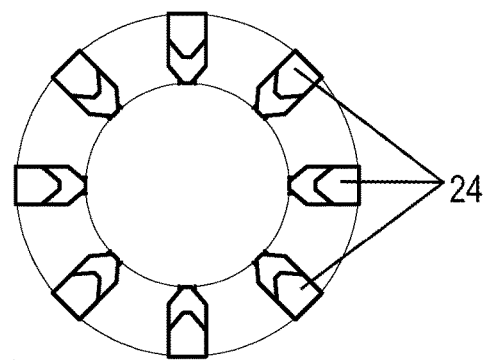
Figure 5C:
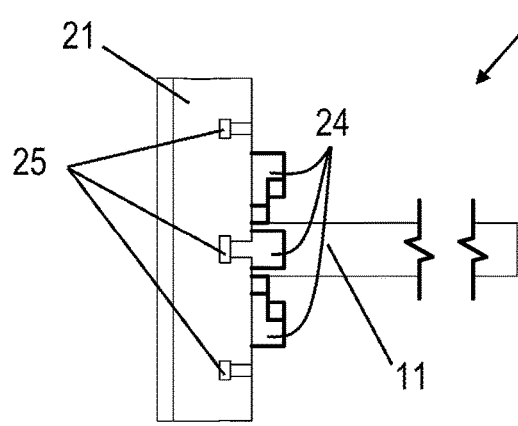
Figure 5D:
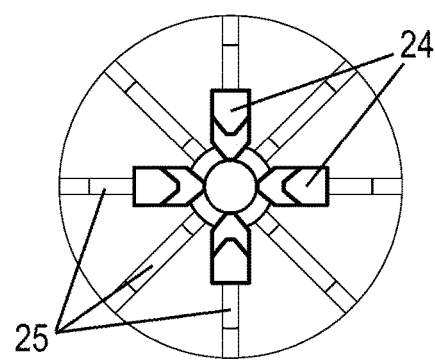

Turning now to FIGS. 2A-2B, two perspective views of an embodiment are shown with additional detail for chuck 20, chuck drive mechanism 30A, and chuck jaw adjustment mechanism 30B. As shown, chuck drive mechanism 30A comprises an external motor 28 (omitted in FIG. 2A for clarity) which turns outer shaft 22A via a belt 29 (also omitted in FIG. 2A) connected to belt attachment 26 (not visible in FIG. 2B), and outer shaft 22A in turn rotates chuck head 21. As further shown, chuck jaw adjustment mechanism 30B comprises a motor 31 that rotates driver gear 32, which interacts with shaft gear 34. Shaft gear 34 rotates inner shaft 22B (set forth subsequently in FIGS. 3A and 3B) to adjust the positions of jaws 24 within slots 25 utilizing a spiral scroll chuck mechanism known in the art.

In an embodiment, this adjustment may be accomplished via an industrial encoder (an example of an industrial encoder usable with the system is an Industrial Encoder Corporation Model IH 200) for determining the position and movement of the chuck jaws 24, which may be located on or adjacent to chuck head 21. Other embodiments of the invention may also include an extension for the adjustment motor 31 enabling it to be externally located (motive force could be transmitted to the driver gear similarly to, e.g., belt 29 transmitting force from the rotational motor 28) or selectively draw from a secondary power source (not shown). Still other embodiments of the invention may omit the mechanical gear-and-pinion drive (detailed in FIGS. 3-5) entirely in favor of e.g., an electric-motor driven drive mechanism.

It is an intent of this invention to provide a manufacturing system which can be retrofitted onto an existing chuck, mill, or lathe mechanism. Thus, the external motor may be any suitable motor capable of rotating the outer shaft 22A. (Belt attachment 26 may be omitted in favor of, e.g., a secondary gear system without departing from the scope of the invention.) Examples of existing mills and lathes which may be suitable for use with the invention include the Mori Seiki™ SL series, Doosan Puma™ 3100 and 400 series, or the HAAS™ ST and VF series.

The relationship between outer shaft 22A and the inner shaft 22B can be controlled by two mechanisms: a disc brake 36 which selectively engages with disc 23 in order to prevent movement of the outer shaft 22A while the inner shaft 22B rotates via the motor 31, and a clutch fork 35 which selectively engages with male clutch cone 37 in order to disengage it from female clutch cone (not shown), which in turn pushes driver gear 32 (connected to male clutch cone 37 via clutch arm 33) out of alignment from shaft gear 34 and, thereby, disconnects motor 31 from the rest of the chuck jaw adjustment mechanism 30A, allowing the external motor (not shown) to drive both outer shaft 22A and inner shaft 22B.

FIGS. 2A-2B depict an embodiment having a chuck head 21 having eight jaws 24 in eight slots 25, although only three of each are highlighted in the interests of clarity. While prior art chucks have featured adjustable jaws which allowed adjustments along pre-set diameters, the jaws 24 are infinitely programmable along the slots 25 and can be adjusted to within 1.5 mm (01. inches) of the size programmed to accommodate varying diameters of workpiece and exert a programmable clamping pressure thereupon. In addition, the jaws 24 may be removed from the chuck head 21 (set forth subsequently) to accommodate smaller workpieces which may not have sufficient diameter to receive force from all eight jaws.

Turning now to FIGS. 3A-4B, an embodiment of the chuck drive and jaw adjustment mechanisms 30A, 30B is shown in greater detail in a side view with partial cross-sections. FIGS. 3A-3B depict the outer shaft 22A and inner shaft 22B engaged, such that the rotation of the shafts are in sync and being driven by the external motor 28 (omitted from FIGS. 3A-4B for clarity) to rotate chuck head 21. FIGS. 4A-4B depict the outer shaft 22A and inner shaft 22B disengaged, such that outer shaft 22A does not rotate and motor 31 drives inner shaft 22B to adjust the position of the jaws 24.

Referring to FIGS. 3A-3B specifically (showing the engaged shafts moving in sync), elastic members 39 are shown in the side view biasing the male clutch cone 37 away from shaft gear 34 without resistance from clutch fork 35. Male clutch cone 37 can be connected via clutch arm 33 (depicted in FIG. 2A) to the driver gear 32. Thus, by pushing the male clutch cone 37 away from the shaft gear 34, the driver gear 32 moves forward and out of mesh with the shaft gear 34, thus failing to translate energy from motor 31 (depicted in FIGS. 2A-2B). Male clutch cone 37 pushes forward into the braking surface of female clutch cone 38, which is of sufficient friction to translate movement between the inner shaft 22B (attached to male clutch cone 37) and the outer shaft 22A (attached to female clutch cone 38). The attachment between the male and female clutch cones 37, 38, as well as the disengagement of disc brake 36 from disc 23, allows rotational movement of the outer shaft 22A to be translated to the inner shaft 22B such that both move in sync to rotate the chuck head 21 and in turn workpiece 11 (depicted in FIG. 1).

Referring to FIGS. 4A-4B specifically (showing the shafts disengaged), clutch fork 35 is shown pressing against the male clutch cone 35. This pressing disconnects male clutch cone 37 from female clutch cone 38, and compresses the elastic members 39, thereby moving shaft gear 34 and driver gear 32 into alignment, and translating rotational energy from motor 31 to inner shaft 22B alone. Meanwhile, disc brake 36 engages with disc 23, thereby blocking any rotation from being imparted by external motor through belt attachments 26 and stopping rotation of the outer shaft 22A (and thus chuck head 21). Instead the rotational motion of inner shaft 22B translates into a scroll chuck system (not shown) located behind chuck jaws 24 and permits the chuck jaws 24 to adjust position within the chuck head 21.

Turning now to FIGS. 5A-5D, an embodiment of the chuck 20 is shown in greater detail illustrating how the system can accommodate varying workpieces. If workpiece 11 has a larger diameter, the chuck head 21 can be configured with eight jaws 24, all at the outer edge of their respective slots 25, as illustrated in FIGS. 4A-4B. If workpiece 11 has a smaller diameter, the chuck head 21 can be configured with only four jaws 24, at the respective inner edges of slots 25. As with the earlier figures, only some of the jaws and slots are highlighted for clarity. Embodiments of the invention may feature any number of slots and jaws, including as few as 2 jaws or as many as are needed to accommodate and adequately steady the diameter of the workpiece 11. The jaws are variably programmable to within 1.5 mm (0.1 inch) in order to control the pressure of the grip relative to the diameter of the workpiece 11.

Figure 6:
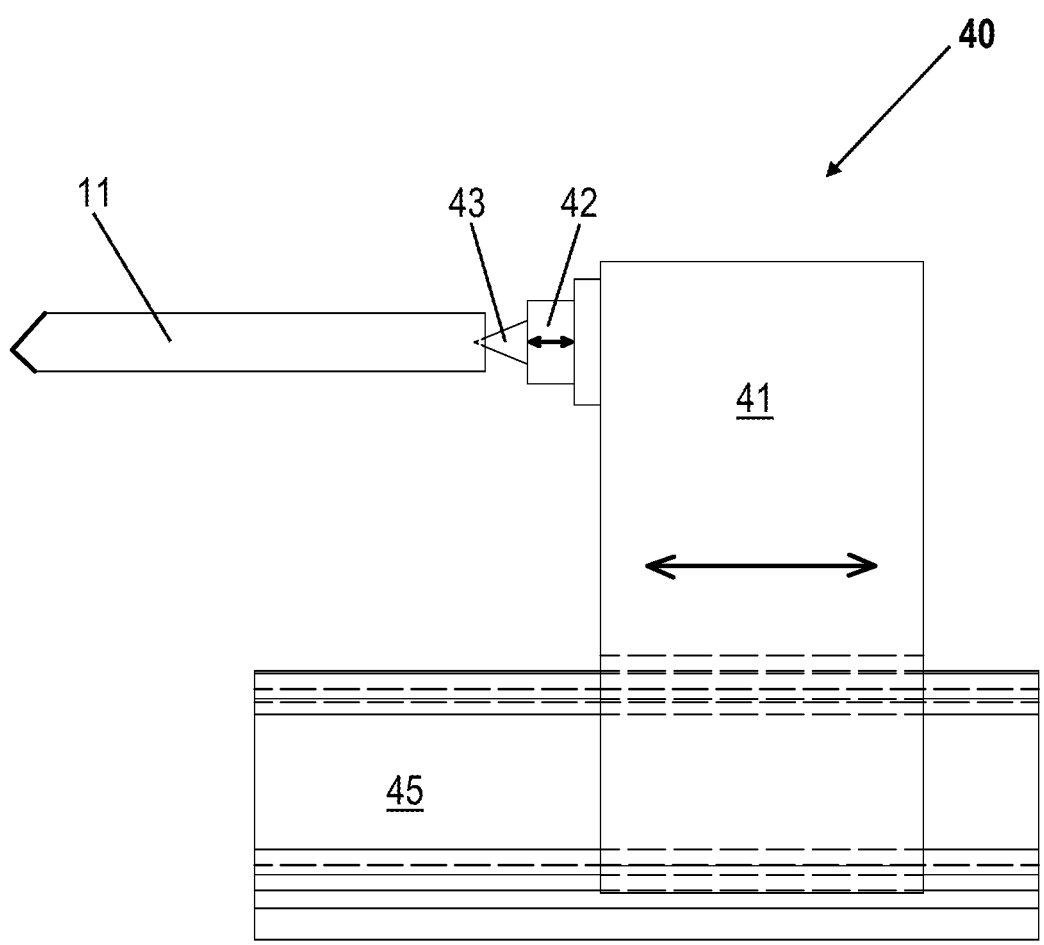
FIG. 6 depicts a side view of an embodiment of the longitudinal positioning mechanism.

Turning now to FIG. 6, an embodiment of the rear support mechanism 40 is shown in greater detail. Rear support mechanism 40 can include at least two components which positionally adjust the workpiece 11 per operator or programmed commands; body 41 can be moved along tracks 45 to physically abut the rear end of the workpiece 11 with cone 43. Additionally, shaft 42 can be extended from body 41 to apply programmatically set pressure to the workpiece 11.

Figure 7A:
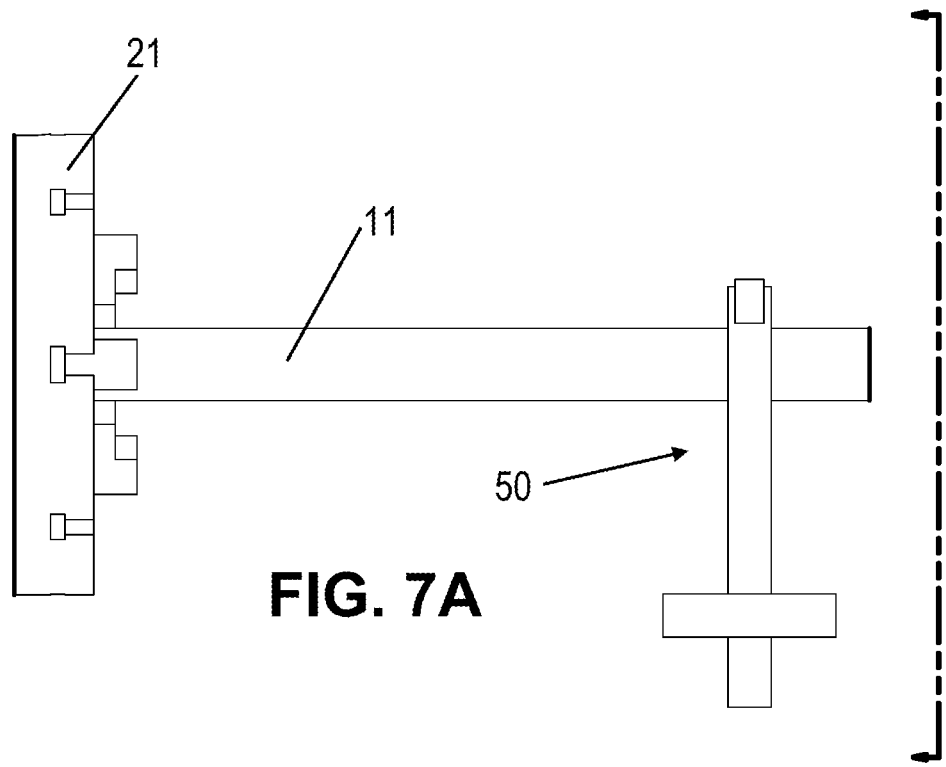
FIGS. 7A-7B depict a side and front view of an embodiment of the centerline positioning mechanism.
Figure 7B:
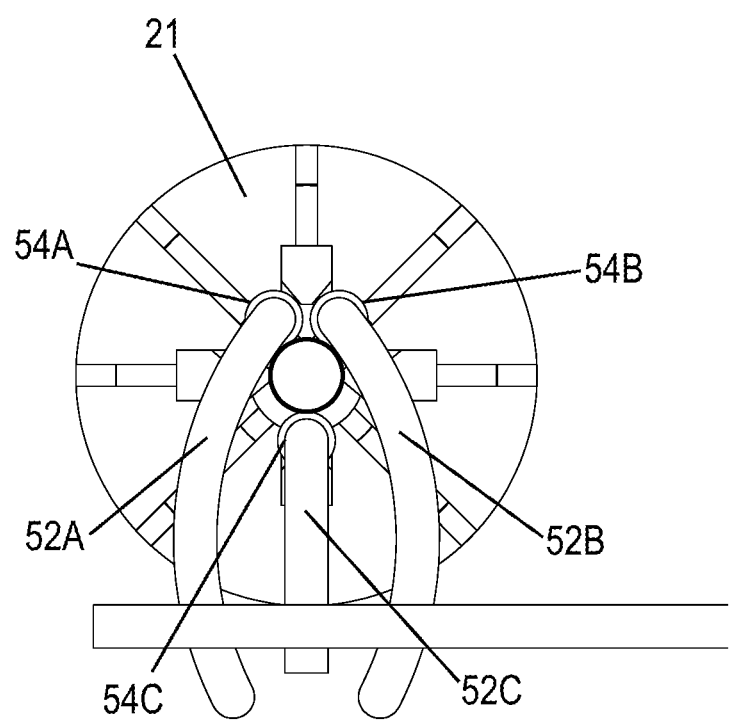

Turning now to FIGS. 7A-7B, an embodiment of the centerline support mechanism 50 is shown in greater detail in relation to chuck head 21. As shown, the centerline support mechanism 50 can comprise three shafts for supporting the workpiece 11, two lateral bowed shafts 52A, 52B, and a straight undershaft 52C. Each shaft 52A-C can comprise a roller surface end 54A-C (respectively) for allowing rotation of the workpiece while still providing support against, e.g., wobbling workpieces with long lengths and narrow diameters. The centerline support 50 can be moveable by operator or program code along the rotational axis perpendicular to the chuck head 21, and shafts 52A-C may be extended or retracted by operators or program code to accommodate differing diameters similarly to jaws 24.

Figure 8A:
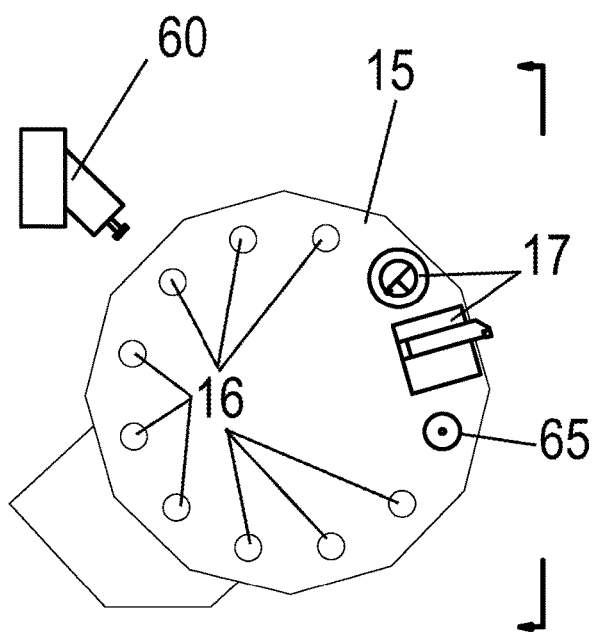
FIGS. 8A-8D depict an embodiment of the set point and measurement sensors as well as an embodiment of the tool housing.
Figure 8B:
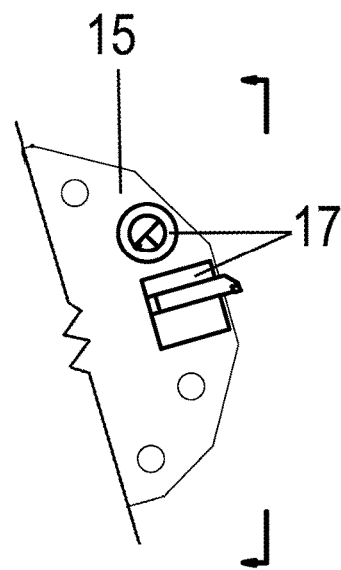
Figure 8C:
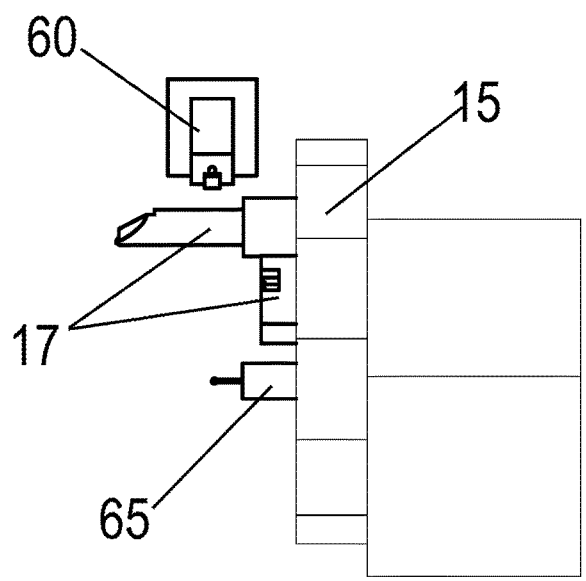
Figure 8D:
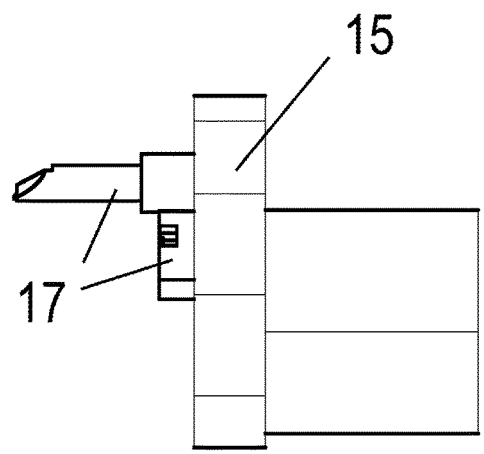

Turning now to FIGS. 8A-8D, an embodiment of the tool housing 15 (which may also be referred to as a "tool turret") is shown in greater detail. Tool housing can comprise sockets 16 (nine empty sockets visible in FIG. 8A), two to three of which are occupied in the depicted embodiment (FIGS. 8A and 8C depict the workpiece sensor 65, which is absent in FIGS. 8B and 8D). The tool housing 15 may house various cutting and shaping tools 17, which may utilize any CNC socketing system known in the art. In an embodiment, a set point sensor 60 can be used to measure the original position of the cutting point of any cutting tools used on workpiece 11 (shown in FIG. 1) when originally installed, as well as after the cutting. This allows an original set point and can also determine wear on the cutting tool. Set point sensor 60 may be a laser, an imaging device, mechanical probe, or any other suitable sensor. Additionally, workpiece sensor 65 can occupy a socket 16 of the tool housing 15 and can monitor the dimensions of workpiece 11 (shown in FIG. 1). Workpiece sensor 65 may be a laser, imaging device, mechanical probe, or any other suitable sensor. In an embodiment, tools 17 may each comprise an RFID tag for easier detection and manipulation by robot 70 when being swapped between storage 85 and tool housing 15.

In use, the system 10 can be controlled by a computer 85 which can adjust the rotation and jaw tolerances of the chuck 20, halt the rotation of chuck 20 using the brake mechanism, adjust the centerline support mechanism 50 or the location and pressure supplied by the rear support mechanism 40. Robot 70 and manipulator 75 can swap workpieces 11 to and from the system 10 as they are shaped, swap different tools into and out of the tool housing 15, and store completed pieces or raw materials in storage systems 80. Storage systems 80 (depicted as vertical carousels; other storage systems may be used within the scope of the invention) may also store new and worn cutting tool heads for tool housing 15, finished workpieces 11, or raw/scrap materials as stored by robot 70 and robot manipulator 75. Storage systems 80 may be programmable to select the tool, piece of raw material and/or the location for the finished piece and present that location to robot 70.

Turning now to FIGS. 9A-9D, two alternate embodiments are shown in which the system 10 can operate in a fourth axis (FIGS. 9A-9B) or a fifth axis (FIGS. 9C-9D). FIGS. 9A-9B show a perspective and cross-sectional view of a chuck 20 with chuck head 21 positioned vertically in order to grip a horizontal workpiece, while FIGS. 9C-9D show a perspective view of a vertical mill embodiment 90 (also depicted in FIG. 1) in which chuck head 21 is positioned horizontally in order to grip a vertical workpiece.

In the fourth axis embodiment depicted in FIGS. 9A-9B, the chuck shaft 22 is directly driven by motor 31A, omitting the gear system from the embodiment depicted in FIGS. 2A-2B. Chuck head 21 is mounted onto support 92 which comprises a plurality of grooves 93 for fixing the position of the chuck head 21 relative to the support 92, which can be moved axially or laterally (i.e., X or Y-axis) within the envelope. This embodiment is preferred for low-RPM milling operations in which the chuck head 21 is only required to rotate incrementally.

In the fifth axis embodiment depicted in FIGS. 9C-9D, the chuck head 21 and the chuck jaws 24 are both driven by motor 31B, again directly rather than utilizing the dual shaft and gear mechanisms of FIGS. 3A-3B. In this embodiment, in addition to the support 92 and grooves 93, chuck head 21 is mounted on axial plate 94, which may be rotated independently of the chuck head 21 via motor 31C, similarly enabling low-RPM milling operations for the vertical configuration.

Figure 10A:
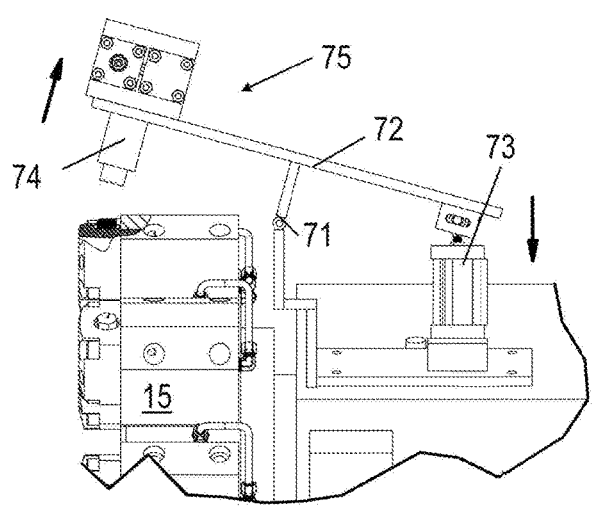
FIGS. 10A-10D depict an embodiment of a robotic manipulator (10A, 10B side view, 10C, 10D front view) exchanging tools to and from the tool housing.
Figure 10B:
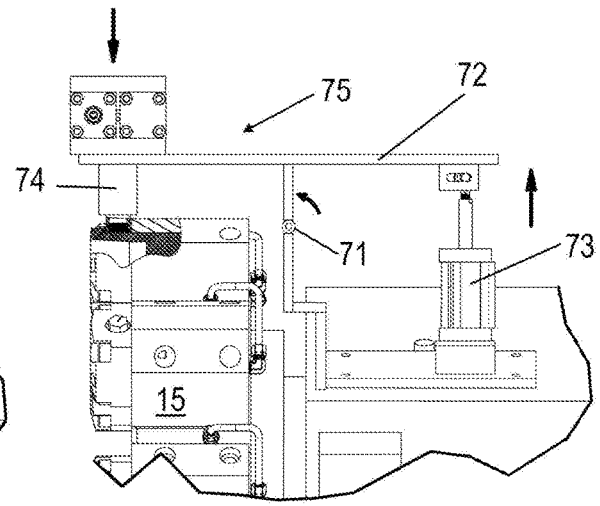
Figure 10C:
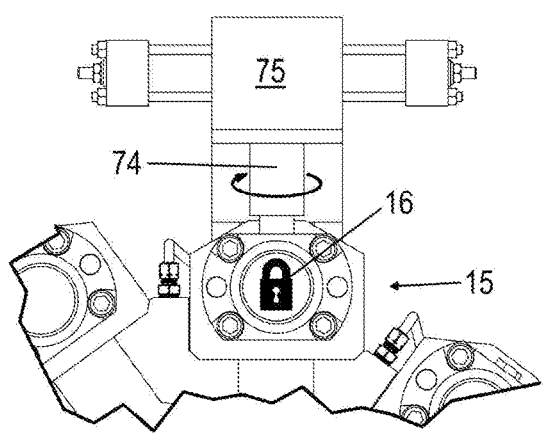
Figure 10D:
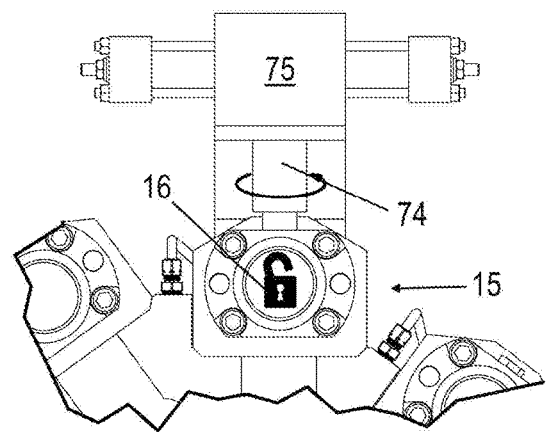

Turning now to FIGS. 10A-10D, two side views and two longitudinal views of an embodiment of robot manipulator 75 are shown interacting with tool housing 15 to set and unset the tool into a socket 16 of the tool housing 15. FIGS. 10A and 10B depict the manipulator 75 comprising a tool attachment head 74 mounted onto one end of a shaft 72. Shaft 72 operates as a lever along hinge 71 and is driven by piston 73 from opposite end of attachment head 74. When the piston 73 extends, the attachment head 74 is driven down into a corresponding locking mechanism of the tool housing socket 16. The attachment head 74 then rotates in order to engage or disengage an internal clamping mechanism (not shown) of the tool housing socket; the tool is shown locked in FIG. 10C and unlocked in FIG. 10D.

Figure 11A:
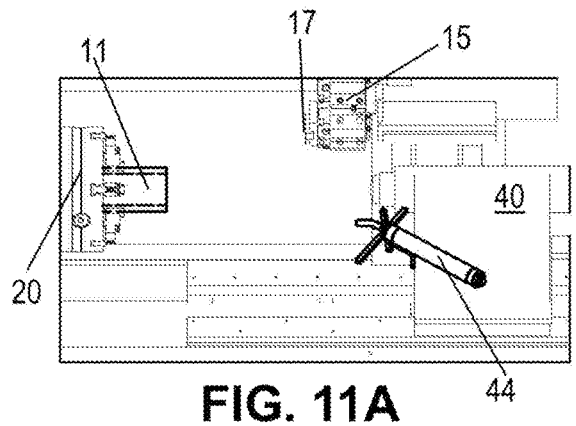
FIGS. 11A-11F depict a side view of an embodiment of a tool catcher and the steps of a part being parted from the workpiece thereon.
Figure 11B:
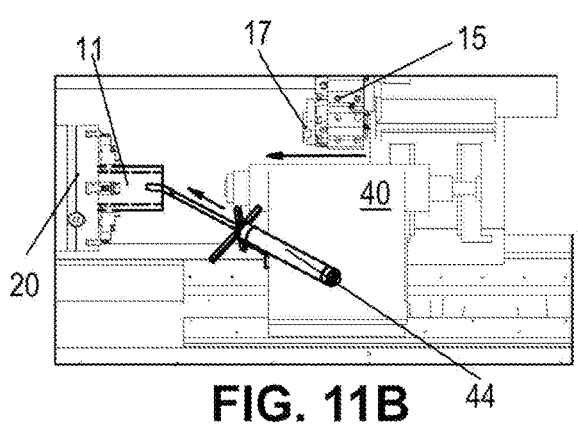
Figure 11C:
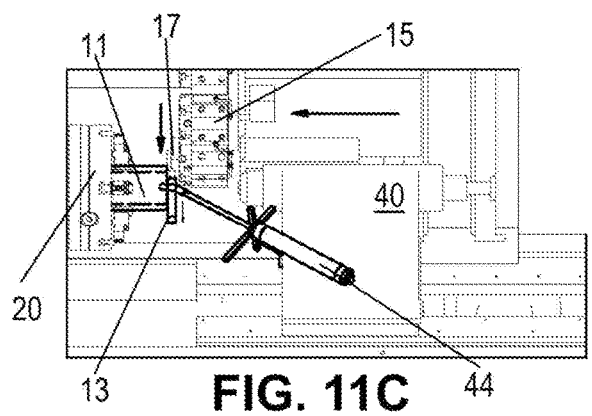
Figure 11D:
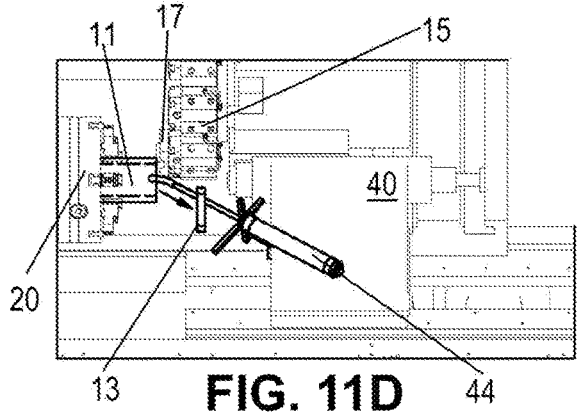
Figure 11E:
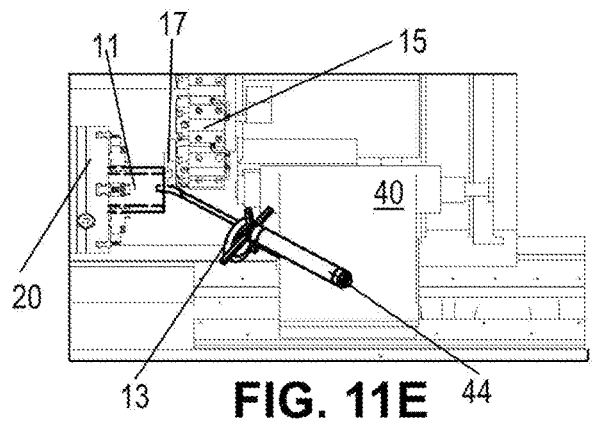
Figure 11F:
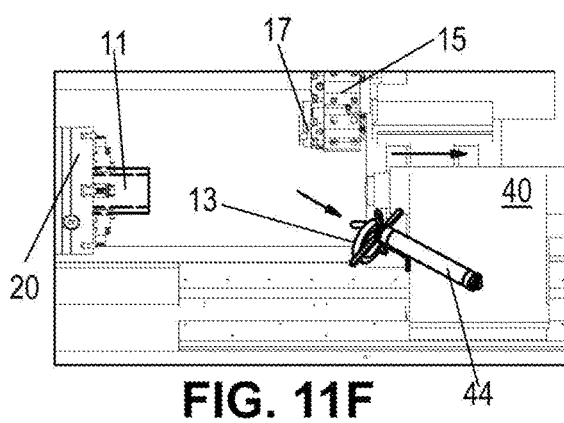

Turning now to FIGS. 11A-11F, the interaction of embodiments of the tool housing 15, chuck 20, and rear support 40 are shown in detail. FIG. 11A shows rear support 40 with parts catcher 44 mounted into it, while chuck 20 holds workpiece 11 and tool housing 15 is in a configuration comprising at least one cutting tool 17. Computer 85 (not shown) determines that a length must be parted off the workpiece 11. FIG. 11B depicts the rear support 40 moving along tracks 45 (see FIG. 6) but not extending the shaft 42 (see FIG. 6); instead parts catcher 44 extends out to within the inner diameter of workpiece 11. FIG. 11C depicts the tool housing 15 moving forward to align with the desired length of the workpiece 11 relative to the cutting tool 17. Cutting tool 17 removes a length of workpiece 11 which becomes ring 13. FIGS. 11D-11E show ring 13 sliding down onto parts catcher 44. FIG. 11F shows the rear support 40 and tool housing 15 returning to their original positions.

Figure 12A:
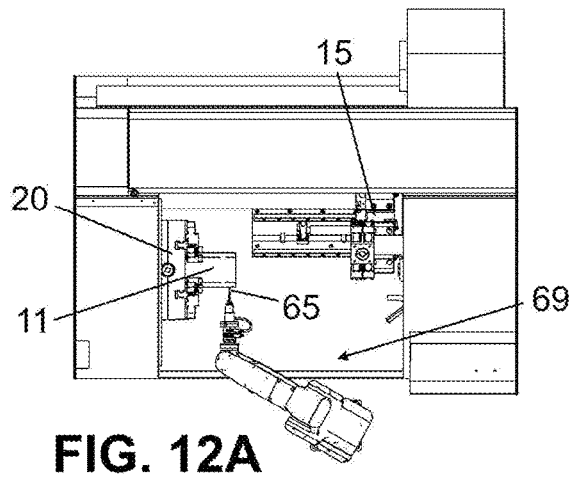
FIGS. 12A-12F depict an alternate embodiment of a measurement sensor (12A, 12C, 12E overhead view, 12B, 12D, 12F side view) mounted to a robot instead of the tool housing.
Figure 12B:
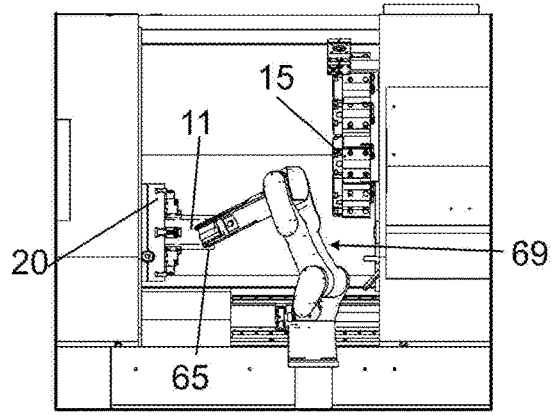
Figure 12C:
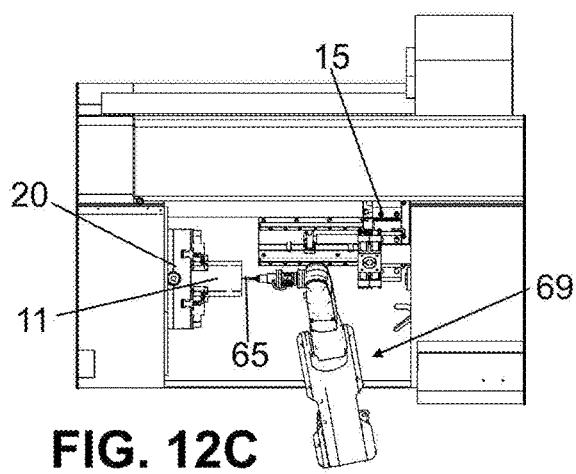
Figure 12D:
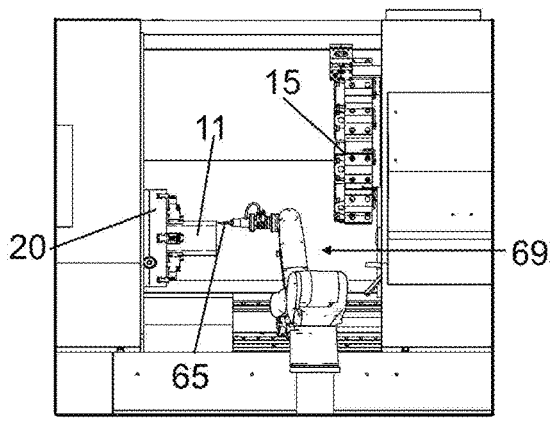
Figure 12E:
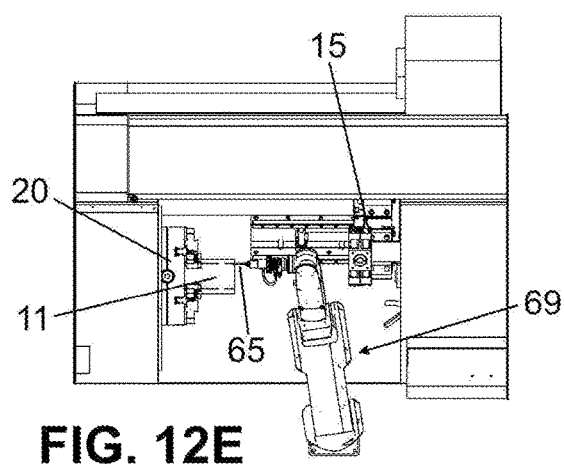
Figure 12F:
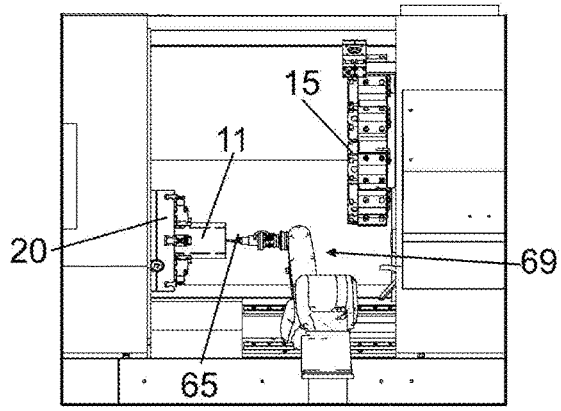

Turning now to FIGS. 12A-12F, an alternate embodiment of the system comprising tool housing 15 and chuck 20 is shown interacting with workpiece sensor 65, which in this embodiment is not a socketed tool in tool housing 15, but is instead mounted on secondary robot 69. (While the embodiment depicts a secondary robot 69 with workpiece sensor 65 distinct from robot 70 with tool manipulator 75, it can be appreciated that other embodiments may include a single robot which comprises both a workpiece sensor 65 and tool manipulator 75.) Secondary robot 69 is mounted on or near the system 10 at any suitable point (e.g., on or next to track 45) and comprises a series of jointed arms which confer a full range of motion allowing it to measure the outside of a workpiece 11 (FIG. 12A overhead, FIG. 12B side), the inner vertical axis of a workpiece 11 (FIG. 12C overhead, FIG. 12D side), and the inner horizontal axis of a workpiece (FIG. 12E overhead, FIG. 12F side).

Figure 16A:
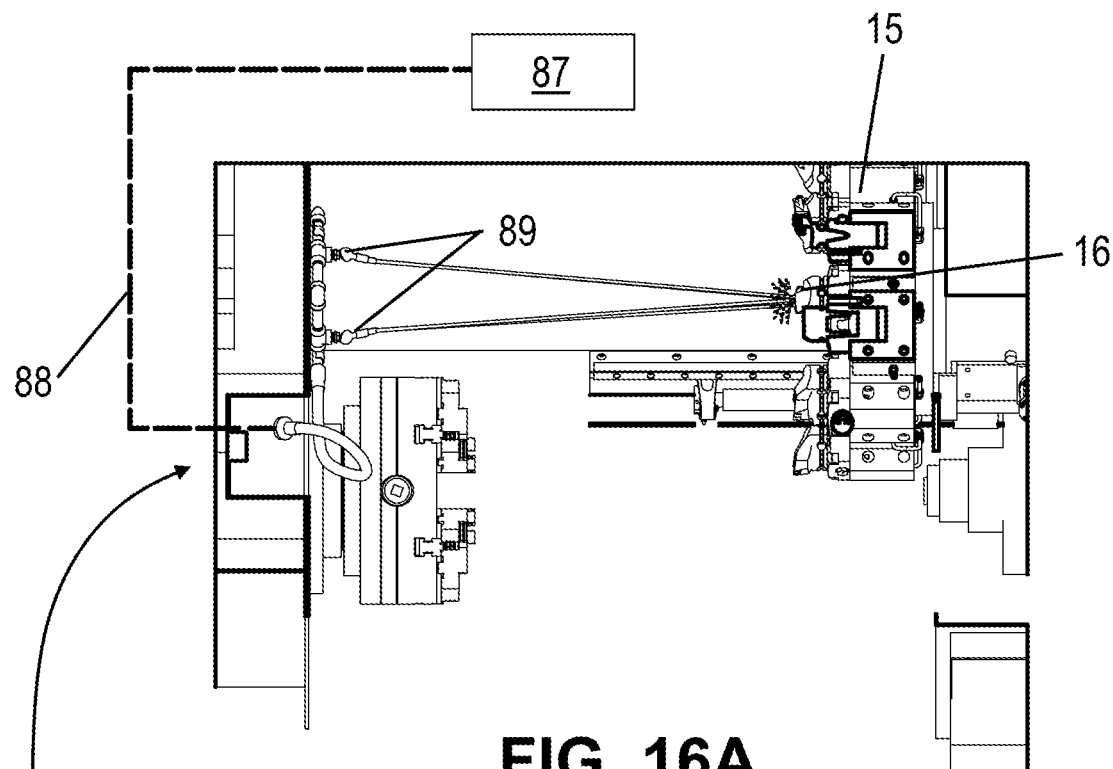
FIGS. 16A and 16B depict an embodiment of a washing mechanism for use with the apparatus.
Figure 16B:
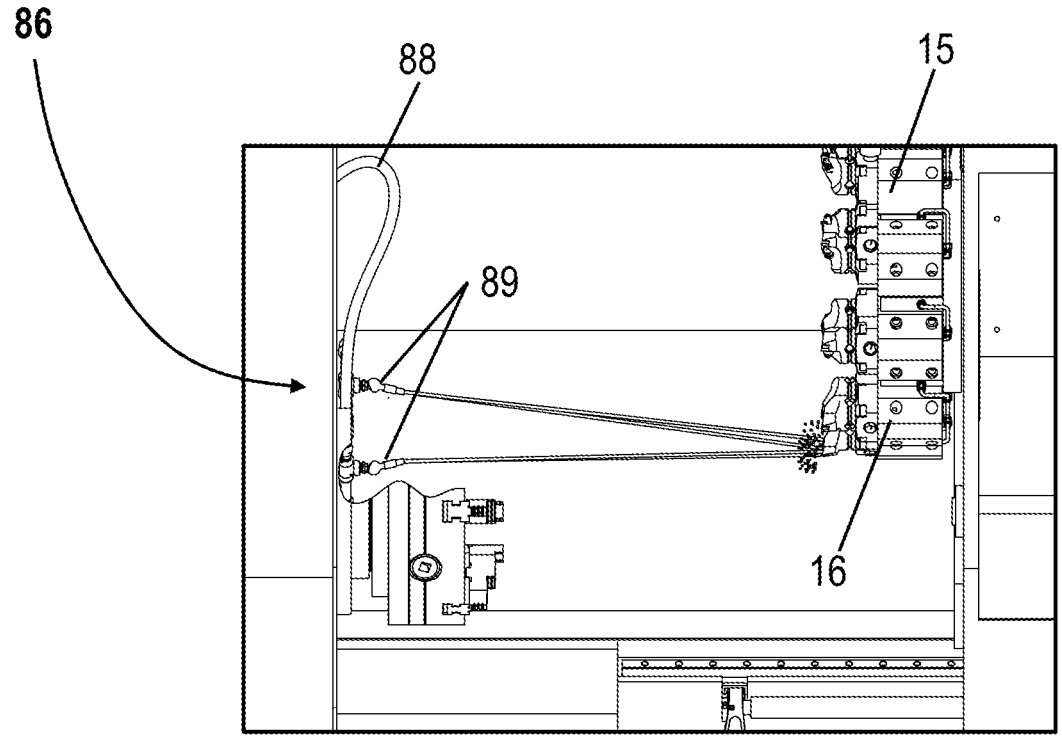

Turning ahead to FIGS. 16A and 16B, an embodiment of a washing apparatus 86 for the system 10 is shown comprising a coolant circuit 87 which connects via conduit 88 with a plurality of nozzles 89 to direct a pressurized stream of liquid (e.g., coolant solution, cleaning solution, or combinations thereof) at the tool turret 15. The embodiment is depicted with two nozzles 89, but it can be appreciated that one or more than two may be utilized. In one embodiment, the direction of the nozzles 89 may be controllable either manually or via the computer 85; in another embodiment, the direction of the nozzles 89 is fixed at a particular socket 16 of the tool turret 15, with the tool turret 15 rotating a tool 17 (not shown) into the path of the nozzles 89. In addition, while the depicted embodiment shows the washing apparatus 86 located substantially parallel and adjacent to the chuck 20, and across from the turret 15, it can be appreciated that other embodiments may vary the position to anywhere with an unobstructed path to the sockets 16 of tool turret 15.

Figure 13:
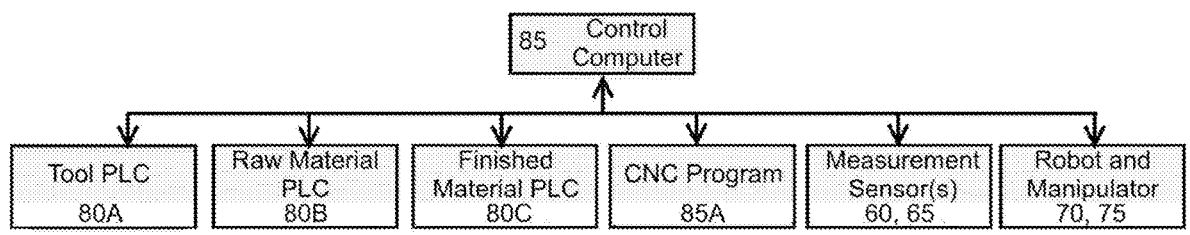
FIG. 13 depicts an embodiment of the overall communication architecture of the system.

Turning now to FIG. 13, an embodiment of the system is shown depicting the various software communications channels available between components of the system 10. Central computer 85 acts as a master controller, receiving signals from go-between, receiving data from programmable logic controllers (PLCs) which may include a tool storage PLC 80A for the storage of tools, raw material PLC 80B for storage of raw/scrap material, and finished material PLC 80C, as well as an underlying CNC control system 85A for executing individual machining programs (as described below), the measurement sensor(s) 60, 65, and (if present) both the measurement and manipulation robots 69, 70.

Turning now to FIGS. 14A and 14B, an embodiment of a computer-implemented control method is charted comprising a control program 100 and a plurality of machining programs 200 which may be run on computer 85. As shown in FIG. 14A, each machining program 200 comprises input parameters 210 specified by a customer; these input parameters 210 comprise instructions for a specific part to be manufactured from a workpiece. Input parameters 210 may comprise a list of tools to be used, a list of paths for those tools to be manipulated along, working dimensions and pressure for the rotating chuck, working heights for the centerline and rear support mechanisms, measurement points and tolerances for quality control (QC) checks of both the workpiece and the tools, thresholds for tooling changes based on increased motor amperage load (for instance, to swap to a more powerful cutter), controlling any additional parts catchers or conveyors, and if necessary, turning over control to manual operation for certain processes.

Once the input parameters 210 are received, the machining program 200 executes instructions to activate (open) a door 220 to work envelope 12, retrieve needed materials from the tool and material storage trays 230, engage in a QC check 240 (and if needed based on the QC check, a tool change), and begin the operations 250. Machining program 200 also comprises a list of tools 260 required for the program that will need to be changed during operation, and storage instructions 270 for the part. In an embodiment, the machining program also contains instructions 280 on what to do with scrap parts (i.e., parts which do not meet measurement criteria specified in input parameters 210); in various embodiments these may be placed alongside raw materials, finished workpieces, or given their own storage unit.

Each machining program 200, once entered, corresponds to a particular part to be machined, and the machining program 200 can be re-run for every part whose input parameters 210 are retained in storage.

The control program 100, depicted in FIG. 14B, controls the machining programs 200 as a collective series, as well as individually. A plurality of machining programs 200, which may represent multiple runs of a single part or multiple parts to be produced in series, are used to generate a master list of tools and materials 110 which encompasses the entire sequence of machining programs 200. Since the machining program 200 only deals with an individual part, the control program 100 is responsible for reconciling any conflicts in tooling, material, or finished parts. For example, a series of machining programs 200 may require more raw material than is currently present in the storage trays. Control program 100 may notify the operator, utilize robot 70 to retrieve more raw material, or if necessary, override machining program 200 in order to skip operations which would require the missing raw material.

Control program 100 comprises a number of decision functions which may override the individual machining programs 200. For instance, the control program 100 may comprise safety parameters 120 such as instructing the door to the work envelope to be closed whenever the machining program 200 specifies the use of coolant or wash liquid, or when the chuck rotates at over 10 rpm, or instructing the door to open when the robots are to take measurements, or replace a tool/workpiece, or when the chuck is unable to rotate due to error or obstruction. The control program may comprise storage parameters 130 which are used both to compare to the generated master list 110 and to keep track of available space for finished parts, which may run out faster than tools or raw material or due to the varying shape of individual workpieces. Tool QC data 140 can override the machining program QC data 240 and provides location and replacement instructions for the robot(s), including user notification and shutdown if there is no replacement tool and no further machine programs which can be run based on the remaining available tools. If a replacement tool is available, control program may instruct a re-run 150 of the machine program 200 which was interrupted by the tool failing a QC check. Storage parameters 130 may also comprise instructions for parts catchers in the case of smaller workpieces that cannot be manipulated directly by the robot(s).

In an embodiment, the control program 100 comprises a graphical user interface (GUI) 160 run on a non-proprietary computer (i.e., a desktop or laptop computer running a consumer operating system such as Windows, MacOS, or Linux). The GUI of the control program 100 may comprise open-source components for, e.g., basic functions such as video display and file storage. The control program 100 may also comprise one or more forms where a user may, at a high level, specify the input parameters 210 via the GUI, thereby enabling the system to generate an individual machining program 200 without the need for the customer to have knowledge of the programming languages (e.g., Karel) used at the low level to command the robotic components of the system.

Figure 14:
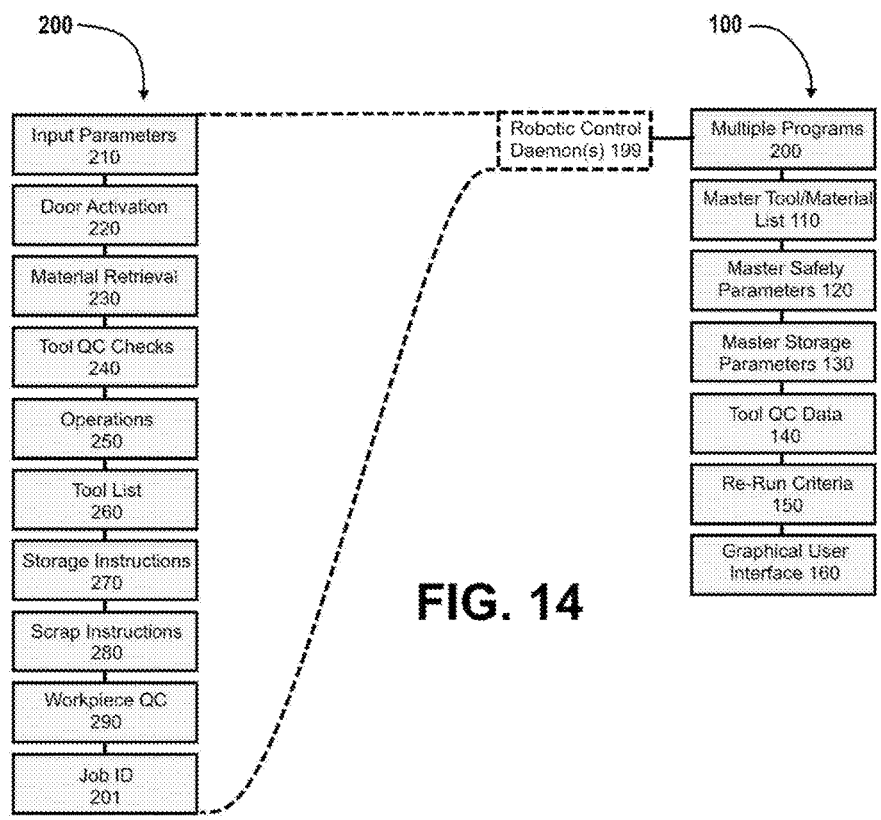
FIG. 14 depicts an embodiment of the contents of an individual machining program and a master control program.

In the embodiment depicted in FIG. 14, communication among the user, control program 100 and the machining programs 200 can be moderated by a plurality of in-memory daemons 199. These daemons 199 correspond to the individual robotic components of the system (e.g., a system having robot 70 and secondary robot 69 may comprise two daemons 199), and act as individualized controller programs. When a user specifies input parameters 210 in the UI (or when such input parameters 210 are recalled from a stored machining program 200), a proprietary command is generated with a unique identifier 201 (e.g., based on a current timestamp) and issued to the corresponding in-memory daemon 199, which proceeds to parse the command into a robot control command, issue it to the robotic components, and wait on a response. When the robot responds, this proprietary response command is parsed and reported back to the control program 100, which saves the response using the unique identifier 201 and displays the result to the user. If the result is a failure, the response command may also include an error code for, e.g., insufficient scrap material, which is parsed into an explanation to the user via the GUI 160 of control program 100.

Figure 15:
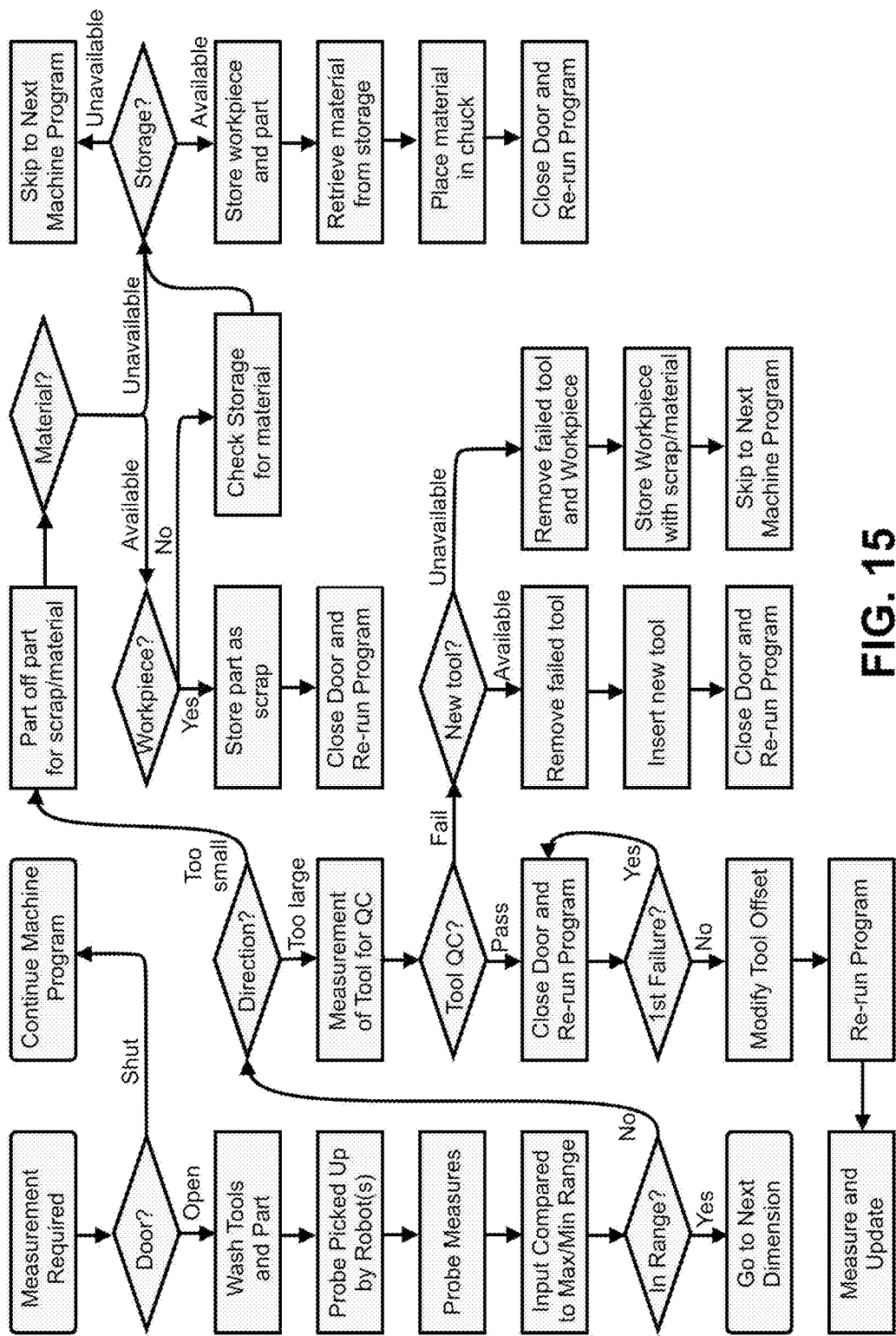
FIG. 15 depicts a flowchart of an embodiment of automatic operation for measuring and machining an inner diameter.

Turning now to FIG. 15, an embodiment of a communication flowchart for the system is shown showing how the control program handles measurement of a part (in this case, the outer diameter). The function begins when the control program or the machining program instructs the system to measure the workpiece's outer diameter. The control program checks to ensure the work envelope door is open (if not, the machining program is overridden and skips to the next step). If the work envelope door is open, the tool and part are washed, the workpiece sensor is positioned along the workpiece by a robot, and the workpiece is measured along the given dimension. This measurement is compared to a maximum and minimum range specified by the machining program. If the part is in range, the measurement function moves on to any other dimensions specified by the machining program.

If the part is out of range, the control program may enter one of two QC functions based on whether the part is smaller or larger than the specified measurement range. If the part is larger than the specified range, the control program proceeds to direct the measurement sensor to measure the tool(s) used in machining the workpiece. If the tool is within QC parameters and the workpiece dimension has not previously exceeded a measurement check, the program is re-run. If the tool is within QC parameters and the workpiece has already exceeded a measurement check, the machining program's tool instructions are offset by one half of the difference between the maximum range and the measured range, and the program is re-run. If the tool is not within QC parameters, the control program checks to see if a replacement is available. If it is, the tool is changed by the robot(s), and the machining program is re-run. If a replacement tool is unavailable, the workpiece is removed from the system by the robot(s) and stored (as raw material or scrap depending on the machining program parameters) and the next machining program is initiated.

If the part is smaller than the specified range, the control program instructs the robot(s) to sever the part from the workpiece and store (as raw material or scrap depending on the machining program parameters) and determine if more raw material is available. The system first checks the material remaining in the machine; if it exceeds the specified ranges, the part program is re-run on the remaining material. If the material does not suffice for another re-run of the machining program, the control program updates the available raw materials list and determines if there is sufficient material remaining in storage. If there is, the robot(s) replace the workpiece and re-run the machining program. If there is not, the workpiece is also removed from the system by the robot(s) and stored (as raw material or scrap depending on the machining program parameters) and the next machining program is initiated.

The example in FIG. 15 is described with respect to a measurement of the outer diameter, but it can be appreciated that the logic may be adapted for other dimensions, e.g., length or inner diameter may be measured the same way. It can also be appreciated that the algorithm may switch the decision functions for "out of range larger" and "out of range smaller" depending on the measurement taken (since, for instance, the inner diameter may be made larger by additional machining and cannot be made smaller).

While the present invention has been described with emphasis on the embodiments depicted and described above, it should be understood that within the scope of the appended claims, the present invention can be practiced other than as specifically described herein, and that the appended claims are intended to include all such alternatives, modifications, and variations that fall within the spirit of the invention and scope of the claims.

The invention claimed is:

1. A system for automating manufacture of a plurality of workpieces, the system comprising:
   a plurality of input parameters corresponding to each respective workpiece of the plurality of workpieces, the plurality of input parameters comprising required tools, raw materials, and physical parameters, wherein the plurality of input parameters correspond to each workpiece of the plurality of workpieces;
   a control computer, wherein the control computer receives the plurality of input parameters corresponding to each workpiece of the plurality of workpieces;
   a chuck with a plurality of jaws, wherein a position and force exerted by the plurality of jaws is programmable;
   a turret that is rotatable about an axis, the turret comprising at least one tool socket, wherein the at least one tool socket is capable of receiving at least one tool of the required tools;
   a plurality of storage units capable of storing the raw materials, the plurality of workpieces, and a plurality of tools comprising the required tools;
   a manipulator comprising a lever having a hinge; a socket driver attached to a first end of the lever; and a piston attached to a second end of the lever, the second end of the lever being disposed opposite the first end of the lever, wherein when the piston is actuated, the lever is pivoted about the hinge such that the socket driver is guided into a lock of the at least one tool socket and is then driven so as to manipulate the at least one socket between a locked position and an unlocked position;
   at least one robot controlled by the control computer, wherein the at least one robot is capable of exchanging the raw materials and the workpieces of the plurality of workpieces between the chuck and the plurality of storage units, and capable of exchanging the required tools from the plurality of tools between the at least one tool socket and the plurality of storage units; and
   at least one measurement device, located exteriorly to the chuck and the at least one tool socket, capable of measuring a physical parameter of each workpiece of the plurality of workpieces,
   wherein the control computer checks the plurality of storage units for the required tools and the raw materials, and sequentially initiates the manufacture of the plurality of workpieces when the required tools and raw materials corresponding to each workpiece of the plurality of workpieces are present.

2. The system of claim 1, wherein the control computer directs the at least one robot to retrieve the required tools from the plurality of storage units.

3. The system of claim 1, wherein the control computer directs the at least one measurement device to measure the physical parameter of each workpiece of the plurality of workpieces.

4. The system of claim 3, wherein the control computer compares the physical parameter of each workpiece to a predetermined range, and wherein the control computer directs the at least one robot to exchange each workpiece from the chuck to the plurality of storage units and initiates the manufacture of each workpiece in which the physical parameter thereof is within the predetermined range.

5. The system of claim 4, wherein the control computer directs the system to resume machining when the physical parameter is greater than the predetermined range and can be decreased, or when the physical parameter is less than the predetermined range and can be increased.

6. The system of claim 4, wherein the control computer directs the system to scrap each workpiece in which the physical parameter thereof is greater than the predetermined range and cannot be decreased or in which the physical parameter thereof is less than the predetermined range and cannot be increased.

7. The system of claim 3, wherein the control computer directs the at least one measurement device to measure the required tools for each workpiece and compare the measurement to a quality control parameter, wherein the control computer directs the at least one robot to replace any required tools which measurement does not meet the quality control parameter, and wherein the control computer directs the system to skip each workpiece for which a replacement tool is unavailable.

8. The system of claim 1, further comprising a catching device, wherein the catching device is able to be directed by the control computer to extend a protrusion within an inner diameter of each workpiece, and wherein the catching device receives parts separated from each workpiece by sliding them along the protrusion.

9. The system of claim 1, wherein the chuck comprises a chuck head, wherein the plurality of jaws comprises a plurality of protrusions extending therefrom, and wherein the control computer is able to move the plurality of protrusions inward and outward relative to a center of the chuck head.

10. The system of claim 1, further comprising:
    at least one nozzle, wherein the at least one nozzle receives a pressurized liquid from a reservoir, and wherein the at least one nozzle directs the pressurized liquid towards the at least one tool socket of the tool turret.

11. The system of claim 10, wherein the control computer directs the tool turret to rotate about the axis such that the at least one tool socket is positioned to receive the pressurized liquid.

12. The system of claim 1, wherein the socket driver manipulates the at least one tool socket between the locked position and the unlocked position so as to lock and unlock the at least one tool in the at least one tool socket.

13. A method of machining a plurality of workpieces within a work envelope, the method comprising:
    providing the system for automating manufacture of the plurality of workpieces according to claim 1;
    loading a plurality of machining programs into a control program, each machining program of the plurality of machining programs corresponding to a respective workpiece of the plurality of workpieces and comprising a respective plurality of input parameters;
    sequentially executing the plurality of machining programs corresponding to each respective workpiece of the plurality of workpieces, each execution comprising:
        retrieving, with the at least one robot, at least one raw material of the raw materials and the at least one tool of the required tools specified by the plurality of input parameters of the respective machining program;
        placing, with the at least one robot, the at least one raw material of the raw materials into the chuck with the plurality of jaws;
        measuring, with the at least one measurement device, the at least one tool;
        comparing the measurement of the at least one tool to a tool quality control value specified by the plurality of input parameters of the respective machining program, placing the at least one tool into the at least one tool socket if the measurement matches the tool quality control value, and storing, replacing, and re-measuring the at least one tool if the measurement does not match the tool quality control value;
        energizing, with the control program, the chuck to a speed and pressure specified by the plurality of input parameters of the respective machining program and, with the at least one tool, machining the at least one raw material into a given workpiece along tool paths specified by the plurality of input parameters of the respective machining program;
        measuring, with the at least one measurement device, the given workpiece and comparing it to a workpiece quality control value specified by the plurality of input parameters of the respective machining program; and
        storing, with the at least one robot, the given workpiece as either a finished part or a scrap part depending on whether the measurement matches or does not match the workpiece quality control value.

\* \* \* \* \*